United States Patent [19]

Teson

[11] Patent Number: 5,222,640
[45] Date of Patent: Jun. 29, 1993

[54] SPARE TIRE MOUNT FOR PICKUP TRUCKS

[76] Inventor: William R. Teson, 4979 S. Coast Hwy., South Beach, Oreg. 97366

[21] Appl. No.: 856,291

[22] Filed: Mar. 23, 1992

[51] Int. Cl.$^5$ .............................................. B62D 43/00
[52] U.S. Cl. .............................. 224/42.24; 224/42.25; 224/42.45 R; 224/42.26; 74/523; 74/528; 74/545
[58] Field of Search ............... 224/42.12, 42.13, 42.14, 224/42.15, 42.19, 42.2, 42.24–42.27, 42.3, 42.32, 42.45 R, 42.42; 157/1.11; 211/23; 74/523, 528, 545, 546, 557; 248/354.3, 354.4, 220.1, 222.1, 222.3, 225.31, 231.91, 231.9, 231.6, 231.3, 231.2

[56] References Cited

U.S. PATENT DOCUMENTS

| | | | |
|---|---|---|---|
| 1,390,904 | 9/1921 | Hazelton | 74/545 |
| 3,204,840 | 9/1965 | Bowen | 224/42.24 |
| 3,613,972 | 10/1971 | Daughhetee | 224/42.24 |
| 3,843,033 | 10/1974 | Wirth, Sr. | 224/42.24 |
| 3,865,291 | 2/1975 | Tidwell | 224/42.24 |
| 3,979,035 | 9/1976 | Huot | 224/42.24 |
| 3,990,618 | 11/1976 | Shattuck | 224/42.24 |
| 4,007,863 | 2/1977 | Norris | 224/42.24 |
| 4,013,203 | 3/1977 | McCauley | 224/42.24 |
| 4,130,227 | 12/1978 | Rice | 224/42.24 |
| 4,212,417 | 7/1980 | Scott | 224/42.21 |
| 4,366,923 | 1/1983 | Koch | 224/42.24 |
| 4,387,837 | 6/1983 | Carr et al. | 224/42.12 |
| 4,416,402 | 11/1983 | Matthew | 224/42.24 |
| 4,598,848 | 7/1986 | Clark | 224/42.12 |
| 4,932,575 | 6/1990 | Ware | 224/42.24 |

Primary Examiner—Henry J. Recla
Assistant Examiner—Robert A. Goldman
Attorney, Agent, or Firm—John F. Ingman

[57] ABSTRACT

A spare tire mount for pickup trucks having a sidewall with an inner surface and an upper ledge which extends inward, turns downward as a flange, and then turns outward as a lip. A support member engages the outward facing lip of the sidewall with a horizontal flange formed to lay atop the lip, a vertical flange formed to lay horizontally adjacent to the lip. A horizontal threaded aperture is formed competely through the support member. An elongated threaded member engages through the threaded aperture of the support member to press against the inner surface of the sidewall when rotated at its outer end, thereby preliminarily propping the spare tire mount between the inner surface and the lip of the sidewall prior to and during the mounting of the spare tire. With the elongated member extending through a lug hole of the mounted wheel, a handle member, having an end which is internally threaded and formed to provide a bearing surface for contact with the lug hole periphery, is threadingly engaged upon the outer end of the elongated threaded member, and rotated inwardly to bear upon the wheel at the lug hole so as to press and secure the spare tire against the downturned flange of the sidewall. The handle member may be padlocked to a second lug hole to prevent rotation. A protective end cap may be located upon the inner end of the elongated member.

10 Claims, 1 Drawing Sheet

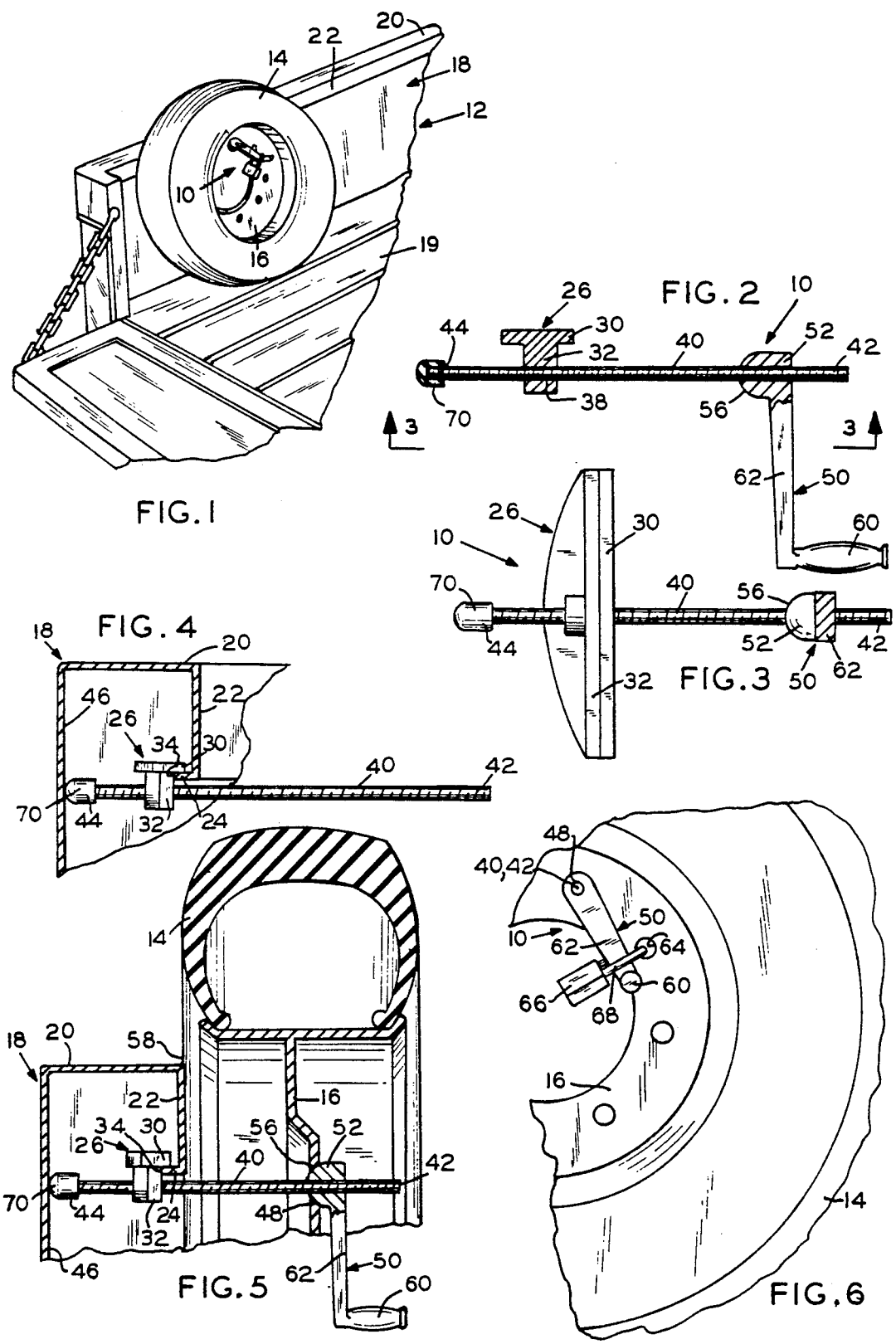

SPARE TIRE MOUNT FOR PICKUP TRUCKS

BACKGROUND OF THE INVENTION

1. Field of the Invention

This invention involves a spare tire mount for pickup trucks, and, more particularly, a spare tire mount which may, without modification of the pickup truck, be preliminarily installed to facilitate mounting of a spare tire along the sidewall of the pickup truck.

2. Description of the Prior Art

Various spare tire mounts for pickup trucks have previously been developed wherein modification of the vehicle such as drilled holes and welded joints are not required. However, these mounts normally expansively secure between the floor and the top portion of the sidewall and are generally complex and relatively heavy. Examples are found in U.S. Pat. Nos. 3,613,972; 4,007,863; and 4,416,402.

Other devices are formed so as to initially abut an outward turned flange at the inside top of the sidewall. Mounting a spare tire upon a device loosely engaging this flange is difficult and may be frustrating in that the insertion of an elongated rod portion of the mount through an appropriate lug hole of the spare wheel may cause the mount to become detached from the pickup truck. Examples of this type of spare tire mount are found in U.S. Pat. Nos. 3,204,840 and 4,130,227. These mounts are generally lighter in weight, less complex and less expensive than the first group indicated above and would be preferred if the spare tire mount was secured upon the flange for the purpose of mounting the spare tire.

What is needed is a simple, lightweight, inexpensive spare tire mount for pickup trucks which may be preliminarily secured to the side rail so as to permit simple and efficient installation of the spare tire upon the mount.

SUMMARY OF THE INVENTION

The present invention provides a spare tire mount for pickup trucks which is designed to satisfy the aforementioned needs. For use with a conventional pickup truck having a bed with sidewalls, where a sidewall has an inner surface and an upper ledge which extends inward, turns downward as a flange, and then turns outward as a lip, the present spare tire mount involves a support member which engages the outward facing lip of the pickup sidewall and an elongated member having an end adjustably positionable against the inner surface of the sidewall so as to preliminarily prop the spare tire mount upon the pickup sidewall prior to and during the mounting of the spare tire.

Accordingly, in the preferred embodiment, the spare tire mount includes a support member having a horizontal flange formed to lay atop the outward facing sidewall lip, a vertical flange formed to lay horizontally adjacent to an outwardly facing edge of the lip, and a horizontal threaded aperture formed completely therethrough. An elongated threaded member engages through the threaded aperture of the support member so that the inner end of the elongated threaded member is adjustably positionable against the inner surface of the sidewall by rotation of its outer end. Thus, when the support member has been positioned to lay upon and about the sidewall lip, and the elongated threaded member is rotated so as to have its inner end press tightly against the inner surface of the sidewall, the support member and the elongated threaded member are propped between the inner surface and the lip of the sidewall, awaiting mounting of the spare tire.

With a spare tire mounted with the elongated member extending through a lug hole of the wheel, a handle member, having one end which is internally threaded and formed to provide a bearing surface for contact with the lug hole periphery, is threadingly engaged upon the outer end of the elongated threaded member. Rotation of the handle member moves the internally threaded end inward to bear upon the wheel at the lug hole and thus press and secure the spare tire against the downturned flange of the sidewall.

The handle member may be formed so that a portion of the handle member may be located proximate a second lug hole formed in the wheel, wherein a padlock may have its shackle inserted through the second lug hole and about the handle member so as to prevent a loosening rotation of the handle member upon the elongated threaded member.

An end cap may be located upon the inner end of the elongated member so as to provide protection to the inner surface of the sidewall.

A method for mounting a spare tire in the bed of a pickup truck utilizing the preferred spare tire mount includes placing the support member with the horizontal flange atop the outwardly extending lip of the sidewall and then rotating the elongated threaded member, which is threadingly connected to the support member through the threaded aperture, until the inner end of the elongated member abuts and bears against the inside surface of the sidewall. This secures the support member above and against the lip of the sidewall, thereby propping the support member and elongated threaded member between the inner surface and the lip of the sidewall. The next step involves mounting the spare tire upon the elongated threaded member through a lug hole, engaging an internally threaded end of a handle member upon the elongated threaded member, and rotating the handle member to a position where the internally threaded end bears tightly upon the wheel at the lug hole, wherein the tire is tightly held against the downturned flange of the sidewall. Additional steps involving locking the spare tire upon the pickup truck include rotating the handle member to a position proximate a second lug hole located on the wheel and installing the shackle of a padlock through the second lug hole and about the handle member so as to lock the handle member in place and prevent unauthorized removal of the spare tire from the pickup truck.

BRIEF DESCRIPTION OF THE DRAWINGS

FIG. 1 illustrates a spare tire mounted on a pickup truck utilizing the spare tire mount.

FIG. 2 illustrates a sectioned side elevation view of the spare tire mount for pickup trucks.

FIG. 3 illustrates a bottom view of the spare tire mount for pickup trucks, as seen at line 3—3 of FIG. 2.

FIG. 4 illustrates the support member and elongated threaded member of the spare tire mount preliminarily mounted to a pickup truck sidewall prior to mounting of a spare tire.

FIG. 5 illustrates a spare tire mounted to the pickup truck sidewall utilizing the preliminarily mounted members as shown in FIG. 4.

FIG. 6 illustrates a manner of locking the handle member of the spare tire mount to secure the spare tire to the pickup sidewall.

DESCRIPTION OF THE PREFERRED EMBODIMENT

Turning now to the drawings, there is shown in FIG. 1 a perspective view of the spare tire mount 10 as mounted upon a pickup truck 12 which secures a spare tire 14 and wheel 16 along the sidewall 18 within the bed 19 of the pickup truck 12. On most pickup trucks 12, the sidewalls 18 have an upper ledge 20 which turns inward, then extends as a downturned flange 22 and finally turns outward as a generally horizontal lip 24, as better seen at FIGS. 4 and 5.

FIGS. 2 and 3 illustrate a preferred embodiment of the spare tire mount 10. A support member 26 is formed with a horizontal flange 30 and a vertical flange 32. As seen in FIGS. 4 and 5, when installed, the horizontal flange 30 rests upon the generally horizontal lip 24 while the vertical flange 32 abuts the edge 34 of the lip 24. A threaded aperture 38 is formed horizontally through the vertical flange 32 at a sufficient distance below the horizontal flange 30 to allow the horizontal flange 30 to be placed upon the lip 24 without interference.

The threaded aperture 38 is formed completely through the vertical flange 32 of the support member 26 so as to allow an elongated threaded member 40, preferably in the form of a common threaded rod, to penetrate through the support member 26. Thus, with the support member 26 having its horizontal flange 30 laying upon the lip 24, the threaded member 40 may be inserted, by rotation of its outer end 42, through the support member 26 until the inner end 44 comes into contact with the inner surface 46 of the sidewall 18. Only moderate additional rotational pressure, as applied manually by the fingers at the outer end 42 of the threaded member 40, is necessary to wedge the spare tire mount 10 between the inner surface 46 of the sidewall 18 and the edge 34 of the outwardly extending lip 24, as seen at FIG. 4, sufficiently to support the spare tire mount 10 by itself.

An intent of the present spare tire mount 10 is to provide a simple, lightweight device that can be preliminarily fixed into a self-supporting position upon the sidewall 18 of the pickup truck 10 so as to enable subsequent installation of the spare tire 14 and wheel 16 upon the spare tire mount 10 with a minimum of effort and without concern that the spare tire mount 10 will become separated from the pickup truck 12 before the spare tire 14 and wheel 16 are locked into place.

Once the support member 26 and elongated threaded member 40 are secured in place, the spare tire 14 and wheel 16 are positioned so that the threaded member 40 extends through an appropriate lug hole 48 in the wheel 16. A handle member 50 having an internally threaded end 52 then is rotatingly installed upon the outer end 42 of the elongated threaded member 40. The handle member 50 is rotated about its threaded end 52 which, upon sufficient turning, provides a bearing surface 56 which presses against the wheel 16 about the periphery of the lug hole 48 of the wheel 16. Continued tightening of the handle member 50 impels the bearing surface 56 of the handle member 50 toward the vertical flange 34 of the support member 26. The spare tire mount 10 thus acts as a clamp with opposing clamping pressures, the first through the vertical flange 32 of the support member 26, hence through the lip 24 and downturned flange 22 of the sidewall 18 and onto the surface 58 of the spare tire 14, and the second through the bearing surface 56 of the handle member 50 onto the wheel 16 at lug hole 48, to effectively pin and support the spare tire 14 and wheel 16 in an upright position against the downturned flange 22 of the sidewall 18.

A preferred handle member 50 is of an L-shape, as illustrated, with a leg in the form of a handle 60 extending at a right angle from leg 62 which joins the threaded end 52 to the handle 60. Such a handle member 50 allows the handle 60 to be rotationally locked to another, preferably adjacent, lug hole 64 by the use of a padlock 66 whose shackle 68 has been inserted through the other lug hole 64 so as to encompass said handle member 50 and restrain said handle 60 in position. With the spare tire 14 properly mounted, this locking of the handle member 50 prevents loosening and removal of the spare tire 14 from the pickup truck 12.

While not essential because of the minimal pressure between the inner end 44 of the threaded member 40 and the inner surface 46 of the sidewall 18 needed to prop the support member 26 and threaded member 40 in position, it may be desirable to place an end cap 70, as made of rubber or flexible plastic, about the Inner end 44 of the threaded member 40 so as to eliminate any possibility of scratching the inner surface 46 of the sidewall 18 when installing the spare tire mount 10 or during use.

The spare tire mount 10 may be fabricated of any material, of suitable strength, including plastics. A currently preferred combination utilizes a support member 26 and handle member 50 which are cast in aluminum and threaded member 40 formed of steel.

An additional advantage of the present design is the ability to vary the length of the threaded member 40 so as to accomodate various pickup truck 12 sidewall 18 and wheel 16 configurations. By the simple replacement of the threaded member 40 by a longer or shorter threaded rod, as commonly available at hardware stores, an optimum length of threaded member 40 may be provided.

It is thought that the spare tire mount 10 of the present invention and its many attendant advantages will be understood from the foregoing description and that it will be apparent that various changes in form, construction and arrangement of the parts thereof may be made without departing from the spirit and scope of the invention or sacrificing all of its material advantages, the form hereinbefore described being merely an exemplary embodiment thereof.

I claim:

1. A spare tire mount for pickup trucks, wherein said pickup truck includes a bed with a sidewall, having an inner surface and an upper ledge which extends inward, turns downward as a flange, and then turns outward as a lip, the spare tire mount comprising;
    a. a support member which includes a horizontal flange formed to lay atop said lip and a vertical flange formed to lay horizontally adjacent to an outwardly facing edge of said lip; said support member having a horizontal threaded aperture formed therein;
    b. an elongated threaded member, having a first end and a second end;
    c. said support member and said elongated threaded member being formed wherein threaded engagement of said elongated threaded member through said threaded aperture of said support member allows said first end of said elongated threaded member to be adjustably positioned against said inner surface of said sidewall by rotation of said second end of said elongated threaded member;

d. said support member having been positioned so as to lay upon and abut said lip, and said first end of said elongated threaded member having been rotated so as to abut and bear upon said inner surface of said sidewall, said support member and said elongated threaded member are propped between said inner surface and said lip of said sidewall;

e. a handle member, having one end which is internally threaded and formed to provide a bearing surface for contact with a periphery about a lug hole of a wheel of a spare tire, wherein, said internally threaded end being threadingly engaged upon said second end of said elongated threaded member, rotation of said handle member moves said internally threaded end inward to bear upon said periphery surface about said lug hole, so that said spare tire becomes secured against said downturned flange of said sidewall.

2. A method for mounting a spare tire in the bed of a pickup truck, wherein said pickup truck includes a bed with a sidewall, having an inner surface and an upper ledge which extends inward, turns downward as a flange, and then turns outward as a lip, said method of mounting a spare tire to a pickup truck comprising the following steps:

a. placing a support member, having a horizontal flange and a vertical flange with a threaded aperture formed therein, with the horizontal flange atop the outwardly extending lip of the side rail;

b. rotating an elongated threaded member, having a first end and a second end, which is threadingly connected to said support member through said threaded aperture, until said first end of said elongated member abuts and bears against the inside surface of the sidewall so as to secure the support member above and against the lip of said side rail, thereby propping said support member and elongated threaded member between said inner surface and said lip of said side wall;

c. mounting a spare tire, having a wheel with a plurality of lug holes, upon said elongated threaded member, over said second end of said elongated threaded member, with said elongated threaded member extending through a first lug hole; and d. engaging a handle member, having an internally threaded end, upon said elongated threaded member and rotating said handle member to a position where said internally threaded end bears tightly upon said wheel at said lug hole, wherein said tire is tightly held against the downturned flange of said sidewall.

3. The method for mounting a spare tire in the bed of a pickup truck, as recited in claim 2, wherein there are additional subsequent steps, as follows:

a. rotating said handle member to a position proximate a second lug hole located on said wheel;

b. fastening a padlock through said second lug hole and about said handle member so as to lock said handle member in place.

4. A spare tire mount for pickup trucks, wherein said pickup truck includes a bed with a sidewall, having an inner surface and an upper ledge which extends inward, turns downward as a flange, and then turns outward as a lip, the spare tire mount comprising:

a. a support member which is formed to bear upon said lip of said pickup sidewall;

b. an elongated member, having a first end and a second end;

c. means for engaging said elongated member with said support member wherein said first end of said elongated member is adjustably positionable to bear against said inner surface of said sidewall so as to prop said support member and said elongated member between said inner surface of said sidewall and said lip; and d. means for fastening a spare tire and wheel upon said propped elongated member whereupon said spare tire is secured against said downturned flange of said sidewall.

5. The spare tire mount, as recited in claim 4, wherein said means for engaging said support member with said elongated member includes said elongated member being threaded and said support member having a threaded aperture formed therein, wherein threaded engagement between said support member and said elongated threaded member allows said first end of said elongated threaded member to be adjustably positioned against said inner surface of said sidewall by rotation of said second end of said elongated threaded member.

6. The spare tire mount, as recited in claim 4, wherein said support member, which is formed to bear upon said lip of said pickup sidewall, includes a horizontal flange formed to lie on top of said lip and a vertical flange formed to lie horizontally adjacent to an outwardly facing edge of said lip.

7. The spare tire mount, as recited in claim 4, wherein said means for fastening a spare tire and wheel upon said propped elongated member includes, where said elongated member has been inserted through a lug hole of said wheel of said spare tire, an internally threaded member which is formed, when threadingly engaged upon said second end of said elongated threaded member and rotated inward, to bear upon a periphery surface of said lug hole of said wheel.

8. The spare tire mount, as recited in claim 7, wherein said internally threaded member is formed as an end portion of a handle member, said handle member being L-shaped with a handle as a fist leg extending orthogonally to a second leg and said second leg extending to adjoin said internally threaded member, wherein said rotation of said handle member by said handle serves to rotate said internally threaded member upon said elongated threaded member.

9. The spare tire mount, as recited in claim 8, wherein said handle member is formed so that a portion of said handle member is capable of movement to a position proximate a second lug hole formed in said wheel, wherein a padlock, having a shackle which is inserted through said second lug hole and about said handle member, may be locked so as to prevent a loosening rotation of said handle member upon said elongated threaded member.

10. The spare tire mount, as recited in claim 4, wherein, additionally, an end cap is located upon said first end of said elongated member so as to provide protection to said inner surface of said sidewall.

* * * * *